(12) United States Patent
Demott et al.

(10) Patent No.: US 11,814,311 B2
(45) Date of Patent: Nov. 14, 2023

(54) MELTER FEEDING SYSTEM

(71) Applicant: KNAUF INSULATION, Vise (BE)

(72) Inventors: Gerard Demott, Majcichov (SK);
Bostjan Marolt, Poljane (SI); David Ducarme, Wavre (BE)

(*) Notice: Subject to any disclaimer, the term of this patent is extended or adjusted under 35 U.S.C. 154(b) by 0 days.

(21) Appl. No.: 17/952,612

(22) Filed: Sep. 26, 2022

(65) Prior Publication Data

US 2023/0097469 A1    Mar. 30, 2023

Related U.S. Application Data

(63) Continuation of application No. 15/546,329, filed as application No. PCT/EP2016/051735 on Jan. 27, 2016, now abandoned.

(30) Foreign Application Priority Data

Jan. 27, 2015   (GB) ..................................... 1501312

(51) Int. Cl.
*C03B 5/00*   (2006.01)
*C03B 3/00*   (2006.01)
(Continued)

(52) U.S. Cl.
CPC ............... *C03B 3/005* (2013.01); *C03B 3/00* (2013.01); *C03B 5/2356* (2013.01);
(Continued)

(58) Field of Classification Search
CPC .................................................... C03B 5/005
See application file for complete search history.

(56) References Cited

U.S. PATENT DOCUMENTS

| 1,761,229 A | 6/1930 | Pedersen |
| 1,999,761 A | 4/1935 | Howard |

(Continued)

FOREIGN PATENT DOCUMENTS

| EP | 3250520 B1 | 1/2020 |
| FR | 679287 | 4/1930 |

(Continued)

OTHER PUBLICATIONS

Office action for co-pending U.S. Appl. No. 15/546,329 (15 pages)—dated Apr. 17, 2020.

(Continued)

*Primary Examiner* — Cynthia Szewczyk
(74) *Attorney, Agent, or Firm* — Knauf Insulation, Inc.; James K. Blodgett

(57) ABSTRACT

The invention relates to a material feeding system (1) for a melter comprising: (i) a substantially horizontal feeding barrel (5) designed to feed solid material through the melter wall (9) into the melt (11) contained in the said melter, and arranged below the level (13) of the melt (11) contained in the melter (30), (ii) said feeding barrel (5) comprising a material input opening (15) and material output opening (17), the material output opening (17) leading into the melt (11) contained in the melter (30), said feeding barrel (5) comprising an internal feeder (20) designed to push solid material (7) loaded through the material input opening (15), in the direction of the longitudinal barrel axis (6) toward the material output opening (17), the end of the internal feeder (20) on the material output side extending at a minimum at a distance from the internal melter surface (19) of two (2) to ten (10) times the diameter of the feeding barrel (5), preferably three (3) to eight (8) times the diameter of the feeding barrel, more preferably three (3) to six (6) times the diameter of the feeding barrel or three (3) to five (5) times the (Continued)

diameter of the feeding barrel (5). The invention further covers a submerged combustion melter equipped with above material feeding system and a process for feeding material into a melter.

14 Claims, 5 Drawing Sheets

(51) Int. Cl.
*C03B 5/235* (2006.01)
*F27D 3/00* (2006.01)
*F27D 3/08* (2006.01)
*F27D 3/04* (2006.01)

(52) U.S. Cl.
CPC ............. *F27D 3/0033* (2013.01); *F27D 3/04* (2013.01); *F27D 3/08* (2013.01)

(56) References Cited

U.S. PATENT DOCUMENTS

| | | | |
|---|---|---|---|
| 6,532,768 | B1 | 3/2003 | Labrot et al. |
| 2007/0122332 | A1 | 5/2007 | Jacques et al. |
| 2009/0158777 | A1* | 6/2009 | Tenzler ................... C03B 5/005 65/157 |
| 2015/0013386 | A1 | 1/2015 | Villeroy De Galhau et al. |
| 2015/0307382 | A1* | 10/2015 | Wang ....................... C03B 3/026 65/335 |

FOREIGN PATENT DOCUMENTS

| | | | | |
|---|---|---|---|---|
| FR | 896276 | | 2/1945 | |
| JP | S60131831 | | 7/1985 | |
| JP | 2005179126 A | * | 7/2005 | ............. C03B 3/005 |
| WO | 2015014921 A1 | | 2/2015 | |

OTHER PUBLICATIONS

Office action for co-pending U.S. Appl. No. 15/546,329 (16 pages)—dated Dec. 1, 2020.
Office action for co-pending U.S. Appl. No. 15/546,329 (16 pages)—dated Aug. 30, 2021.
Office action for co-pending U.S. Appl. No. 15/546,329 (13 pages)—dated Mar. 7, 2022.
Office action for co-pending U.S. Appl. No. 15/546,329 (8 pages)—dated Jun. 24, 2022.
Written Opinion of the International Searching Authority re PCT/EP2016/051735 (8 pages)—dated Aug. 1, 2017.
Response to Communication Pursuant to Rules 161(1) & 162 EPC re European patent application No. 16701667.4 (2 pages)—dated Mar. 6, 2018.
Communication Under Rule 71(3) EPC—Intention to Grant European patent application No. 16701667.4 (7 pages)—dated Aug. 23, 2019.
Communication Under Rule 71(3) EPC—Text Intended for Grant of European patent application No. 16701667.4 (16 pages)—dated Aug. 23, 2019.

* cited by examiner

MELTER FEEDING SYSTEM

CROSS-REFERENCE TO RELATED APPLICATIONS

This application is a continuation of U.S. application Ser. No. 15/546,329, filed Jul. 26, 2017, which is a U.S. national counterpart application of International Application Serial No. PCT/EP2016/051735, filed Jan. 27, 2016, under 35 U.S.C. § 371, which claims priority to GB Application Serial No. 1501312.1, filed Jan. 27, 2015, the disclosures of which are hereby incorporated herein by reference.

TECHNICAL FIELD

The present invention relates to an improved feeding system for melters, more particularly melters of clinker or vitreous or glassy material, including but not limited to submerged combustion melters. The invention further relates to melters equipped with a feeding system and to a process for feeding material under melt level.

BACKGROUND

Melters, more particularly melters of vitreous material and clinker, are generally operated at high temperatures with a more or less agitated or stirred melt bath. Raw material may be loaded from above the melt but it may in certain instances also be desirable to charge material into the melt below melt level.

Underlevel feeding devices require particular attention as they are subject to high stresses and wear due to the corrosive effect of the melt and melt pressure and temperatures, in addition to the wear due to the feeding of the material they are intended to feed.

Submerged combustion melters are characterized by the fact that they have one or more burner nozzles arranged below the surface of the melt, in a lance, in the melter walls and/or melter bottom, preferably in the melter bottom, such that the burner flame and/or combustion products pass through the melt and transfer energy directly to the melt. The submerged combustion melter provides efficient mixing in the melt and homogenizes the melt in terms of temperature profile and composition leading to a high quality product. It also favors the absorption of raw material into the melt and improves heat transfer to fresh raw material. This reduces required residence time in the melter prior to withdrawal for downstream treatment. Overall the energy efficiency of submerged combustion melters is significantly improved compared to conventional shaft melters or rotary kilns.

SUMMARY

The present invention now seeks to provide a suitable material feeding system for a melter comprising:
   a substantially horizontal feeding barrel designed to feed solid material through the melter wall into the melt contained in the said melter, and arranged below the level of the melt contained in the melter,
   said feeding barrel comprising a material input opening and material output opening, the material output opening leading into the melt contained in the melter,
   said feeding barrel comprising an internal feeder designed to push solid material loaded through the material input opening, in the direction of the longitudinal barrel axis toward the material output opening,
the end of the internal feeder on the material output side extending at a minimum at a distance from the internal melter surface of two (2) to ten (10) times the diameter of the feeding barrel, preferably three (3) to eight (8) times the diameter of the feeding barrel, more preferably three (3) to six (6) times the diameter of the feeding barrel or three (3) to five (5) times the diameter of the feeding barrel.

DETAILED DESCRIPTION

Figure 1:
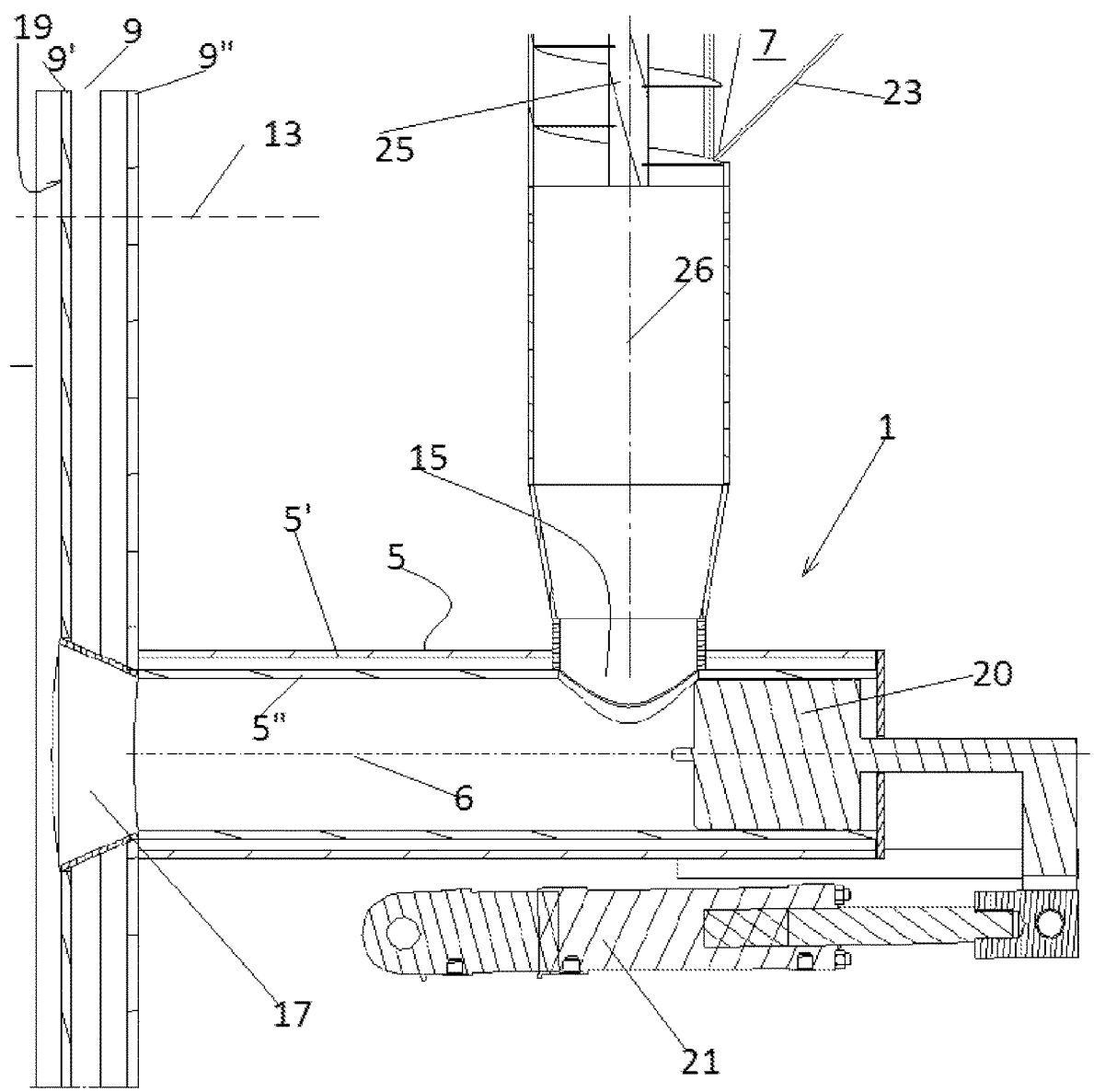
FIG. 1 shows a cross-sectional view of an underlevel feeding system according to the invention.

The skilled person will easily determine the maximum distance at which the internal feeder may operate, taking all relevant parameters, including but not limited to pressure in the melter, feed material temperature, barrel temperature, mechanical stress due to friction in the feeding barrel, mechanical limit of the unit activating the internal feeder, into consideration.

The feeding barrel wall or walls of the material feeding system may comprise double steel walls separated by circulating cooling liquid, preferably water. The internal feeder may be a feeding piston, preferably hydraulically activated. In the alternative, it may be a feeding screw. In view of the high thermic stress, the screw may be water cooled, such as by water circulation through the screw axis.

The material feeding system may be used with a method and/or melter disclosed in any of WO 2015/014917, WO 2015/014918, WO 2015/014919, WO 2015/014920 or WO 2015/014921, each of which is hereby incorporated by reference.

A material charge chute may advantageously be connected to the material input opening. Such a charge chute has the advantage of providing a material buffer upstream of the feeding barrel. Preferably, in the case of a feeding piston, a screw feeder may be arranged between the charge chute and the feeder input opening. The screw feeder charges the material under pressure into the feeding barrel and ensures tight closure or sealing of the material input opening. The screw feeder may advantageously be arranged inclined to the longitudinal barrel axis. Preferably, the screw feeder is arranged perpendicularly to the longitudinal barrel axis, even more preferably vertically.

The melter may be any type of melter, but the invention feeder is particularly advantageous in the case of submerged combustion melters. It is known that submerged combustion melters generate a highly agitated or highly stirred melt. Loading raw material at the top of the melt may lead to entrainment of fines by the fumes of the melter into the chimney. It may thus be desirable to charge raw materials under the melt level of submerged combustion melters. Underlevel raw material charging thus reduces the risk of fines escaping through the chimney. A further advantage consists in the provision of improved incorporation of the raw material in the melt with concomitant improved energy transfer from the melt to the fresh raw material.

The term "feeding barrel" is used in this context to define a longitudinal substantially tubular element which shows a substantially circular or polygonal cross-section. In the case of a polygonal cross-section, the feeding barrel diameter is understood to mean the smallest diagonal.

The terms "below the level of the melt" are understood to mean in this context "at a height from the melter bottom at which liquid melt is continuously present during an operational melting period"; that is between two halts at which the melter is not operational to melt vitreous material. This definition excludes the height from the melter bottom at which liquid melt appears sporadically as a consequence of the agitation of the melt.

According to further aspect, the present invention also provides a process for feeding material into a melter, below the level of the melt contained in the said melter, comprising pushing the said material substantially horizontally through a feeding barrel into the melt by way of an internal feeder, thereby maintaining the internal feeder at a minimum at a distance from the internal melter surface of two (2) to ten (10) times the diameter of the feeding barrel, preferably three (3) to eight (8) times the diameter of the feeding barrel, more preferably three (3) to six (6) times the diameter of the feeding barrel or three (3) to five (5) times the diameter of the feeding barrel.

The internal feeder advantageously is a feeding piston moved from a position uncovering the material input opening to allow for admission of material under pressure, to a position closing the material input opening, thereby pushing the material into the melt.

According to yet another aspect, the invention provides a melter, preferably a submerged combustion melter, comprising a material feeding system as described above.

Preferably, the submerged combustion is performed such that a substantially toroidal melt flow pattern is generated in the melt, having a substantially vertical central axis of revolution, comprising major centrally inwardly convergent flows at the melt surface; the melt moves downwardly at proximity of the vertical central axis of revolution and is recirculated in an ascending movement back to the melt surface, thus defining a substantially toroidal flow pattern. The generation of such a toroidal flow pattern ensures highly efficient mixing of the melt and absorption of raw material into the melt, and homogenizes the melt in terms of temperature profile and composition, thus leading to high quality melt product. At the vertical axis of revolution of said toroidal flow pattern, the flow vectors have a downward component reflecting significant downward movement of the melt in proximity of said axis. Towards the melter bottom, the flow vectors change orientation showing outward and then upward components.

A toroidal melt flow pattern may be obtained using submerged combustion burners arranged at the melter bottom in a substantially annular burner zone imparting a substantially vertically upward directed speed component to the combustion gases. Advantageously, the burners are arranged with a distance between adjacent burners of about 250-1250 mm, advantageously 500-900 mm, preferably about 600-800, even more preferably about 650-750 mm. It is preferred that adjacent flames do not merge.

Each burner axis and/or a speed vector of the melt moving upwards over or adjacent to the submerged burners may be slightly inclined from the vertical, for example by an angle which is $\geq 1°$, $\geq 2°$, $\geq 3°$ or $\geq 5°$ and/or which is $\leq 30°$, preferably $\leq 15°$, more preferably $\leq 10°$, notably towards the center of the melter. Such an arrangement may improve the flow and directs melt flow away from the outlet opening and/or towards a center of the melter thus favoring a toroidal flow.

Each central burner axis may be inclined by a swirl angle with respect to a vertical plane passing through a central vertical axis of melter and the burner center. The swirl angle may be $1 \geq °$, $\geq 2°$, $\geq 3°$, $\geq 5°$ and/or $\leq 30°$, $\leq 20°$, $\leq 15°$ or $\leq 10°$. Preferably, the swirl angle of each burner is about the same. Arrangement of each burner axis at a swirl angle imparts a slightly tangential speed component to the upward blowing flames, thus imparting a swirling movement to the melt, in addition to the toroidal flow pattern.

The burner zone is defined as a substantially annular zone. Burner arrangements, for example on an elliptical or ovoid line within the relevant zone are possible, but the burners are preferably arranged on a substantially circular burner line.

Preferably, the flow pattern comprises an inwardly convergent flow at the melt surface followed by a downwardly oriented flow in proximity of the central axis of revolution of the toroid. Said central axis of revolution advantageously corresponds to the vertical axis of symmetry of the melter. By axis of symmetry is meant the central axis of symmetry and, if the melter shows a transversal cross-section which does not have any single defined axis of symmetry, then the axis of symmetry of the circle in which the melter section is inscribed. The downwardly oriented flow is followed by an outwardly oriented flow at the bottom of the melter and a substantially annular upward flow at proximity of the burners, reflecting recirculation of melt toward the burner zone and in an ascending movement back to the melt surface, thus defining a substantially toroidal flow pattern.

The inwardly convergent flow vectors at the melt surface advantageously show a speed comprised between 0.1-3 m/s. The downward oriented speed vectors at proximity of the vertical central axis of revolution are preferably of significant magnitude reflecting a relatively high speed of material flowing downwardly. The downward speed vectors may be between 0.1-3 m/s. The melt and/or the raw materials within the melter, at least at one portion of the melter and notably at the melt surface (particularly inwardly convergent flow vectors at the melt surface) and/or at or proximate a vertical central axis of revolution, may reach a speed which is $\geq 1$ m/s, $\geq 0.2$ m/s, $\geq 0.3$ m/s or $\geq 0.5$ m/s and/or which is $\leq 2.5$ m/s, $\leq 2$ m/s, $\leq 1.8$ m/s or $\leq 1.5$ m/s.

The preferred toroidal flow pattern ensures highly efficient mixing and homogenizes the melt in terms of temperature profile and composition. It also favors the absorption of raw material into the melt and improves heat transfer to fresh raw material. This reduces required residence time in the melter prior to withdrawal, while avoiding or at least reducing the risk of raw material short cutting the melt circulation.

In one preferred embodiment, the burners are arranged at a distance of about 250-750 mm from the side wall of said melting chamber; this favors the preferred flow described above and avoids flame attraction to the melting chamber side walls. Too small a distance between burners and side wall may damage or unnecessarily stress the side wall. While a certain melt flow between burner and wall may not be detrimental and may even be desirable, too large a distance will tend to generate undesirable melt flows and may create dead zones which mix less with the melt in the center of the melter and lead to reduced homogeneity of the melt.

The distance between submerged burners is advantageously chosen such as to provide the desired toroidal flow pattern within the melt but also to avoid that adjacent flames merge. While this phenomenon depends on many parameters such as temperature and viscosity of the melt, pressure and other characteristics of the burners, it has been found advantageous to select a burner circle diameter comprised between about 1200 and 2000 mm. Depending on burner type, operating pressure and other parameters, too large a diameter will lead to diverging flames; too narrow a diameter will lead to merging flames.

Preferably at least 6 burners are provided, for example arranged on a burner circle line, more preferably 6 to 10 burners, even more preferably 6 to 8 burners, depending on the melter dimensions, burner dimensions, operating pressure and other design parameters.

Each burner or each of a plurality of a group of burners, for example opposed burners, may be individually controlled. Burners close to a raw material discharge may be controlled at different, preferably higher gas speeds and/or pressures than adjacent burners, thus allowing for improved heat transfer to the fresh raw material that is being loaded into the melter. Higher gas speeds may be required only temporarily, that is, in the case of batch wise loading of fresh raw material, just during the time period required for absorption of the relevant load into the melt contained in the melter.

The melting chamber is preferably substantially cylindrical in cross section; nevertheless, it may have an elliptical cross section or polygonal cross section showing more than 4 sides, preferably more than 5 sides.

The composition of a glass melt produced in a melter of the invention may typically comprise:

|  | Possible melt composition (% weight) |
| --- | --- |
| $SiO_2$ | 35-70 |
| $Al_2O_3$ | 5-30 |
| CaO | 5-20 |
| MgO | 0-10 |
| $Na_2O$ | 0-20 |
| K2O | 0-15 |
| $Fe_2O_3$ (total iron) | 0-15 |
| $B_2O_3$ | 0-10 |
| $TiO_2$ | 0-5 |
| $P_2O_5$ | 0-3 |
| MnO | 0-3 |
| $Na_2O + K_2O$ (alkali metal oxide) | 5-30 |
| CaO + MgO (alkaline earth metal oxide) | 5-30 |
| SiO2 + Al2O3 | 50-85 |

Figure 2:
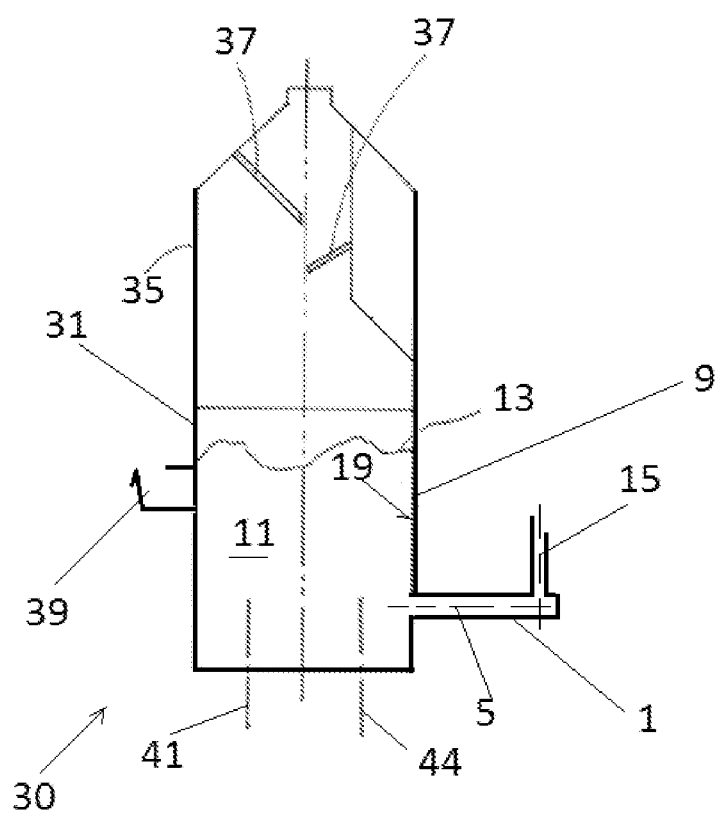
FIG. 2 shows a schematic representation of a submerged combustion melter equipped with a feeding system of the invention.
Figure 3:
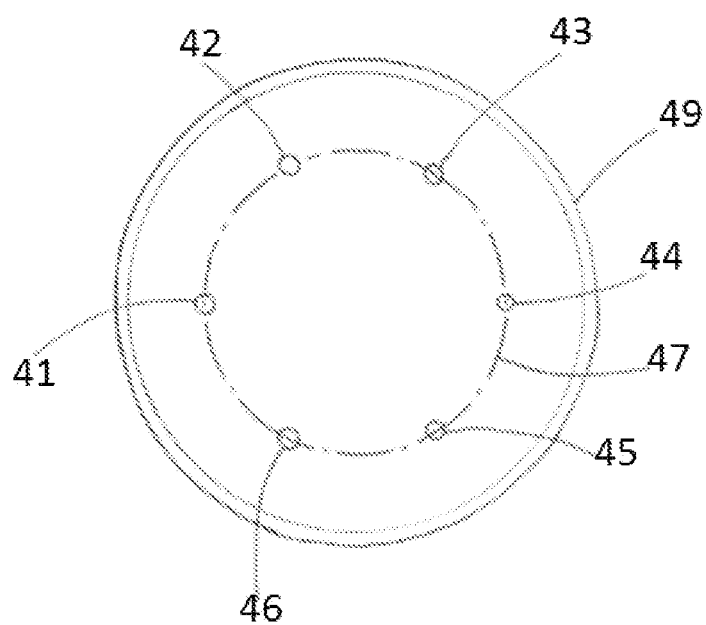
FIG. 3 shows an advantageous burner arrangement in the melter.

An embodiment of a feeding system suitable for use in accordance with the present invention is described below, with reference to the appended drawings of which:

FIG. 1 shows a cross-sectional view of an underlevel feeding system according to the invention;

FIG. 2 shows a schematic representation of a submerged combustion melter equipped with a feeding system of the invention;

FIG. 3 shows an advantageous burner arrangement in the melter; and

Figure 4A:
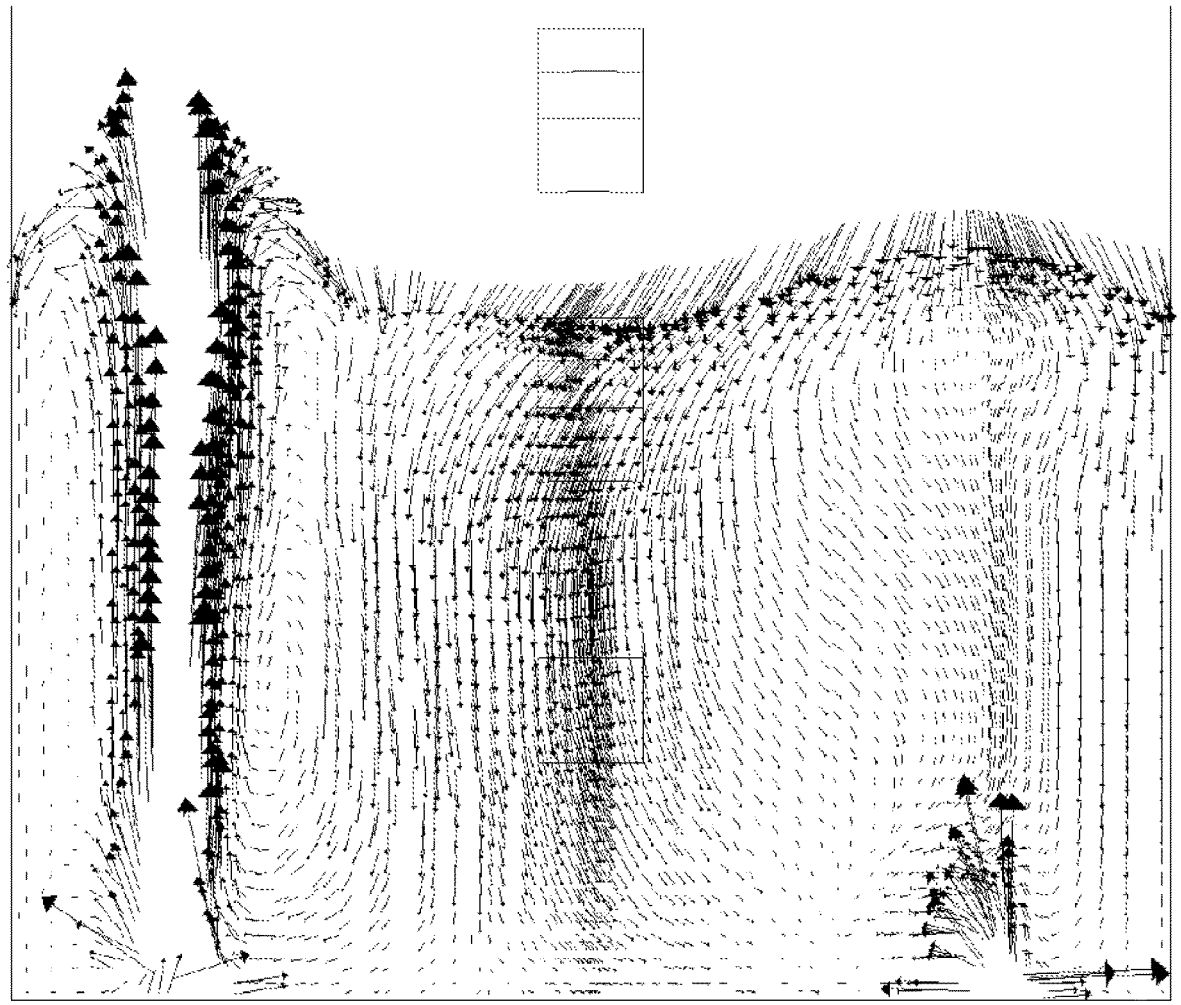
FIGS. 4a and 4b are schematic representations of the melt flow in a preferred submerged combustion melter.
Figure 4B:
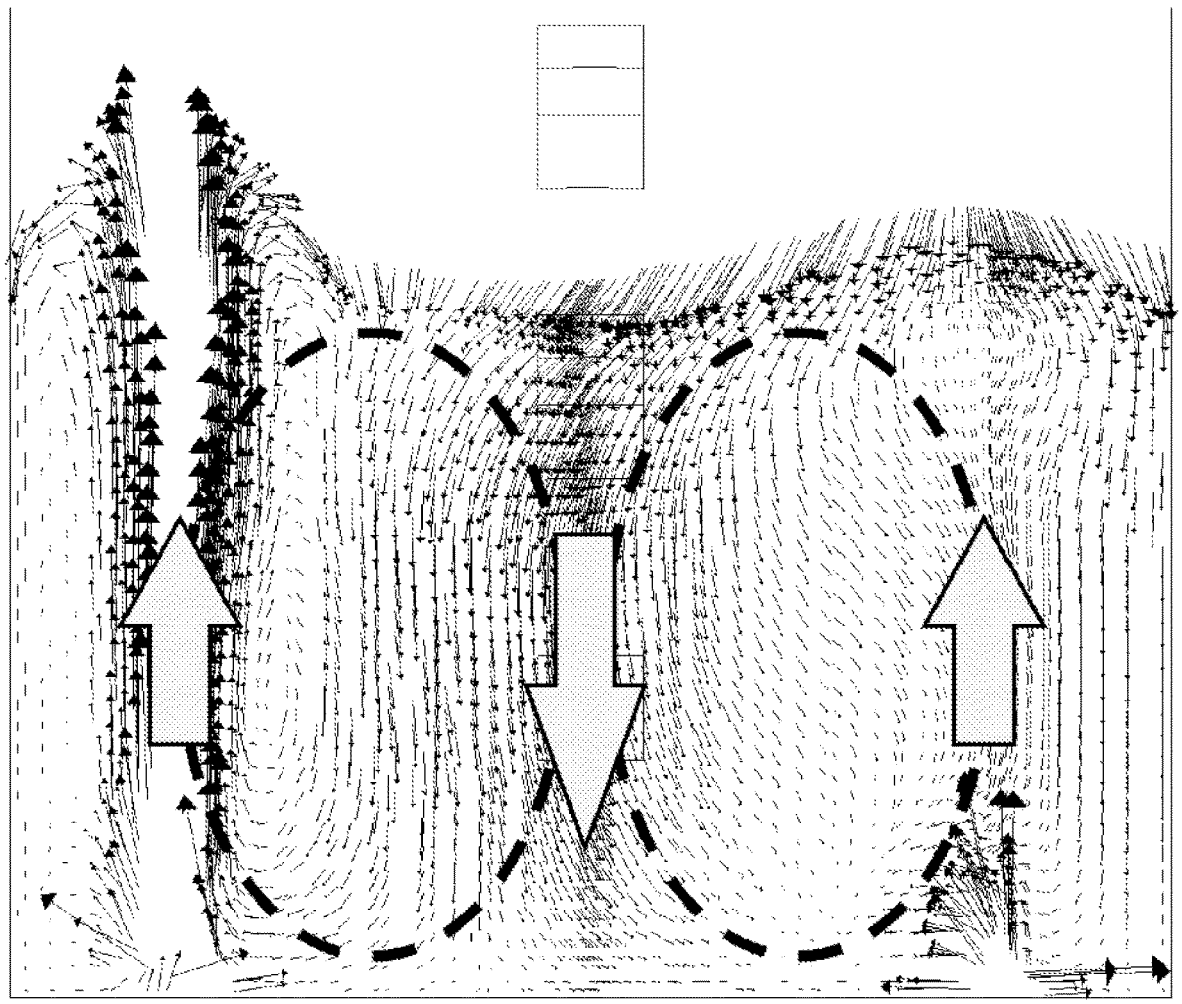

FIGS. 4a and 4b are schematic representations of the melt flow in a preferred submerged combustion melter.

With reference to FIG. 1, the feeding system 1 comprises a substantially horizontal feeding barrel 5 designed to feed solid material 7 through the melter wall 9 into the melt 11 contained in a melter. The feeding system is arranged below the level 13 of melt 11 contained in the melter. The feeding barrel 5 comprises a material input opening 15 and material output opening 17, said material output opening leading into melt 11 contained in the melter. The feeding barrel 5 further comprises a hydraulically activated piston 20 designed to push solid material 7 loaded through the material input opening 15, in the direction of the longitudinal barrel axis 6 toward the material output opening 17. In its open position, piston 20 uncovers the material input opening 15, hence allowing material to be charged into the feeding barrel 5. When the hydraulic unit 21 moves piston 20 in a forward stroke, piston 20 pushes material 7 loaded in barrel 5 toward the melter. The piston is advantageously moved up to a position closing the material input opening 15. In this position, the end of the piston head extends at a distance from the internal melter surface 19 of approx. 4 times the diameter of feeding barrel 5. It has been found that by maintaining the internal feeder at such a distance from the actual melt bath, the internal feeder is unlikely to be in contact with high temperature liquid melt, whereby it nevertheless is tolerated that part of the feed material actually melts in barrel 5. The invention arrangement hence protects the internal feeder from high stresses and wear caused by high temperature corrosive liquid melt.

According to a preferred embodiment, the feeding barrel wall or walls 5 are cooled and comprise double steel walls 5',5" separated by circulating cooling liquid, preferably water.

As shown in FIG. 1, feed material 7 is unloaded from a chute 23, preferably into a screw feeder 25. The screw feeder compacts the feed material 7 received from chute 23 and feeds it under pressure into the barrel 5. The compacted feed material forms a stopper which tightly closes input opening 15 and hence reduces the risk of hot gases or liquid melt escaping through the feed material input. The screw feeder 25 shows an axis 26 substantially perpendicular to the barrel axis 6. Feeding barrel 5 being essentially horizontal, screw feeder axis is preferably vertical.

In an alternative, the internal feeder 20 could also be a feeding screw, the melt oriented end of which extending at a distance to the internal melter surface 19 of no less than 2 to 10 times the feeding barrel diameter.

As shown in FIG. 2, the feeding system 1 is arranged below melt level 13 through melter wall 9. The melter advantageously is a submerged combustion melter. The illustrated melter 30 comprises: a cylindrical melting chamber 31 having an internal diameter of about 2.0 m which contains the melt 11; an upper chamber 35; and a chimney for evacuation of the fumes. The upper chamber 35 is equipped with baffles 37 that prevent any melt projections thrown from the surface 13 of the melt being entrained into the fumes. A raw material feeder 5 is arranged below the melt level 13 and is designed to load fresh raw material into the melt 11 contained in melter 30 through melter wall 9.

As more specifically shown at FIG. 3, the bottom of the melting chamber comprises six submerged burners 41, 42, 43, 44, 45, 46 arranged on a circular burner line 47 concentric with the melter axis and having a diameter of about 1.4 m. The melt may be withdrawn from the melting chamber 30 through a controllable outlet opening or syphon-type discharge 39 located in the melting chamber side wall, substantially opposite the feeding device 1. The melt withdrawn from the melter may then be allowed to cool and subjected to downstream forming steps as required. These forming steps may include cullet formation, flat glass forming, hollow glass forming as well as mineral fiber or wool formation.

FIGS. 4a and 4b show a toroidal flow pattern as preferably established in a submerged combustion melter as represented in FIGS. 2 and 3. The melt follows an ascending direction close to submerged burners 41, 42, 43, 44, 45, 46 which are arranged on a circular burner line 47, flows inwardly towards the center of the circular burner line at the melt surface 13, and flows downwards in the proximity of the said center. The toroidal flow generates agitation in the melt, ensures good stirring of the melt, and absorption of raw material into the melt with efficient transfer of energy to the fresh raw material.

The temperature within the melt may be between 1100° C. and 1600° C., or 1200° C. and 1500° C., or 1200° C. and 1450° C., preferably 1250° C. and 1400° C., depending on the composition of the melt, desired viscosity and other parameters. Preferably, the melter wall 9 is a double steel wall cooled by a cooling liquid, preferably water. Cooling water connections provided at the external melter wall allow a flow sufficient to withdraw energy from the inside wall such that melt can solidify on the internal wall 19 and the cooling liquid, here water, does not boil.

The submerged burners may comprise concentric tube burners operated at gas flow rates of 100 to 200 m/s, preferably 110 to 160 m/s and generate combustion of fuel gas and oxygen containing gas within the melt. The combustion and combustion gases generate agitation within the melt before they escape into the upper chamber and then through the chimney. These hot gases may be used to preheat the raw material and/or the fuel gas and/or oxidant gas (eg oxygen, industrial oxygen have an oxygen content 95% by weight or oxygen enriched air) used in the burners. The fumes are preferably filtered prior to release to the environment, optionally using dilution with ambient air to reduce their temperature prior to filtering.

The obtained melt is of high quality. The above described production process is less energy demanding then known processes, because of the choice of submerged combustion melters that allow for improved energy transfer to the melt, shorter residence times and thus less heat loss, and because the high stirring leads to a more homogenous melt at reduced melt viscosity, which in turn may allow for operation at reduced temperatures. Furthermore, submerged combustion may advantageously be performed in water-cooled melters which are more easy and less costly to maintain and repair and which further allow for recycling of the energy withdrawn from the cooling fluid.

The invention claimed is:

1. A material feeding system (1) for a melter (30) comprising:
   a horizontal feeding barrel (5) having a barrel diameter and a longitudinal barrel axis (6), designed to feed solid material (7) through a melter wall (9) having an internal melter surface (19) into a melt (11) contained in the melter (30), and arranged below the level (13) of the melt (11) contained in the melter (30),
   said feeding barrel (5) comprising a material input opening (15) and a material output opening (17), the material output opening (17) leading into the melt (11) contained in the melter (30),
   said feeding barrel (5) comprising an internal feeder (20) having an end proximal to the material output opening (17) designed to push solid material (7) loaded through the material input opening (15), in the direction of the longitudinal barrel axis (6) toward the material output opening (17),
   wherein
   the end of the internal feeder (20) proximal to the material output opening (17) extends at a distance from the internal melter surface (19) of no less than two (2) to no greater than ten (10) times the diameter of said feeding barrel (5) and
   a section of said feeding barrel (5) extending over said distance consists of a barrel having said barrel diameter and said longitudinal barrel axis (6).

2. The material feeding system of claim 1, wherein the feeding barrel (5) comprises double steel walls (5',5") separated by circulating cooling liquid comprising water.

3. The material feeding system of claim 1, wherein a material charge chute (23) is connected to the material input opening (15).

4. The material feeding system of claim 1, wherein the internal feeder (20) is a feeding piston.

5. The material feeding system of claim 4, wherein the feeding piston is a hydraulically (21) activated feeding piston.

6. The material feeding system of claim 1, wherein the internal feeder (20) is a feeding screw.

7. The material feeding system of claim 1, wherein a screw feeder (25) is provided at the barrel material input opening (15).

8. The material feeding system of claim 7, wherein the axis (26) of the screw feeder (25) is arranged substantially vertically and substantially perpendicular to the longitudinal barrel axis (6).

9. A melter (30) comprising the material feeding system (1) of claim 1.

10. The melter of claim 9 comprising a submerged combustion melter.

11. A process for feeding material into a melter (30) through a melter wall (9) having an internal melter surface (19), below the level (13) of a melt (11) contained in the melter (30), comprising pushing the material substantially horizontally through a feeding barrel (5) having a barrel diameter and a longitudinal barrel axis (6), into the melt (11) by way of an internal feeder (20), thereby maintaining the internal feeder (20) at a distance from the internal melter surface (19) of no less than two (2) to no greater than ten (10) times the diameter of said feeding barrel (5), wherein a section of said feeding barrel (5) extending over said distance consists of a barrel having said barrel diameter and said longitudinal barrel axis (6).

12. The process of claim 11, wherein the material is loaded under pressure through a material input opening (15) into the feeding barrel (5).

13. The process of claim 12, wherein the internal feeder (20) is a feeding piston moved from a position uncovering the material input opening (15) to allow for admission of the material under pressure, to a position closing the material input opening (15), thereby pushing the material into the melt (11).

14. The process of claim 11, wherein the material fed into the melter (30) is melted therein and withdrawn for downstream processing.

* * * * *